United States Patent [19]

Seguin

[11] Patent Number: 5,947,826
[45] Date of Patent: Sep. 7, 1999

[54] BALL-TYPE CONSTANT-VELOCITY UNIVERSAL JOINT

[75] Inventor: Nicolas Seguin, Le Mans, France

[73] Assignee: GKN Automotive AG, Lohmar, Germany

[21] Appl. No.: 08/792,083

[22] Filed: Jan. 31, 1997

[30] Foreign Application Priority Data

Feb. 1, 1996 [FR] France ................................ 96 01230

[51] Int. Cl.[6] .................................................. F16D 3/224
[52] U.S. Cl. .......................................... 464/145; 464/906
[58] Field of Search .................................. 464/141, 143, 464/145, 906

[56] References Cited

U.S. PATENT DOCUMENTS

| | | | |
|---|---|---|---|
| 4,915,672 | 4/1990 | Girguis | 464/145 |
| 5,433,668 | 7/1995 | Harz et al. | 464/145 |
| 5,453,052 | 9/1995 | Harz et al. | 464/145 |
| 5,542,885 | 8/1996 | Krude et al. | 464/145 |
| 5,599,234 | 2/1997 | Harz et al. | 464/145 |
| 5,616,081 | 4/1997 | Krude et al. | 464/145 |

*Primary Examiner*—Eileen Dunn Lillis
*Attorney, Agent, or Firm*—Howard & Howard

[57] ABSTRACT

The cavity of the bell housing 4, having six grooves 17, forms an axially inner spherical cap 15 extended by an axially outer cylindrical part 16. In order to keep the cage 9 in a predetermined axial position, there are provided at least three undercut cylindrical recesses 20 formed in the cylindrical part 16 between a first set of grooves 17; for each recess 20, a filling member 30 which substantially matches the recess 20; and a holding means 23 for holding a filling member 30 in each of the recesses 20.

13 Claims, 3 Drawing Sheets

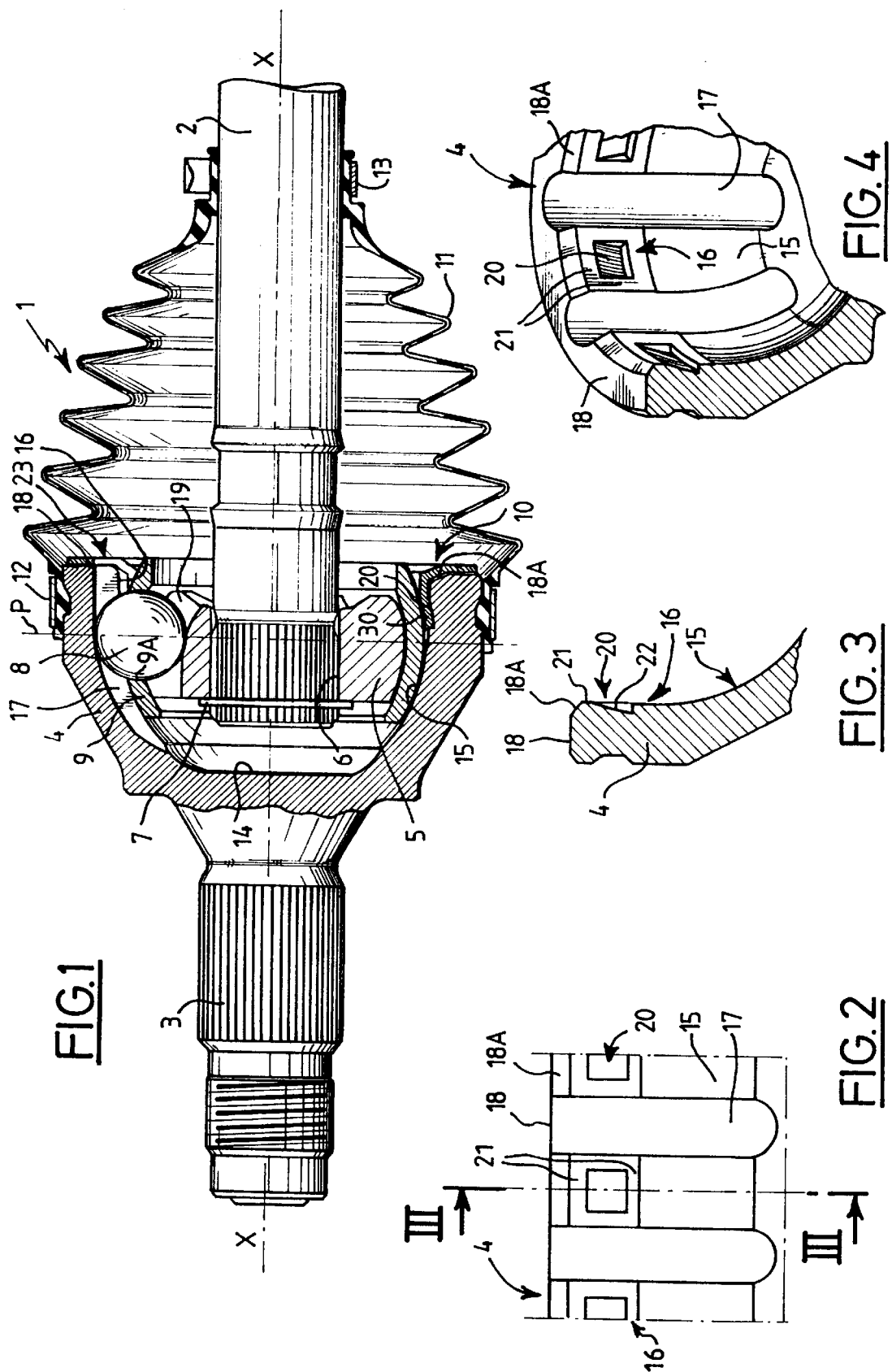

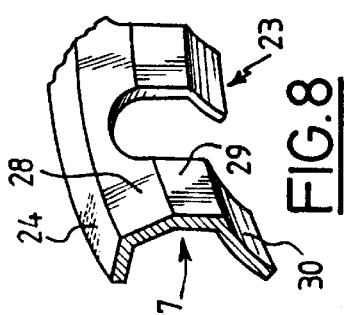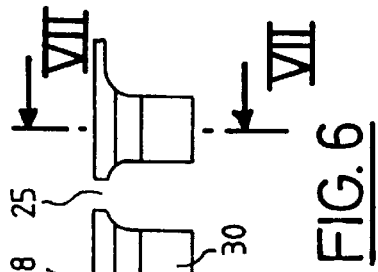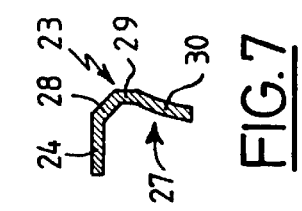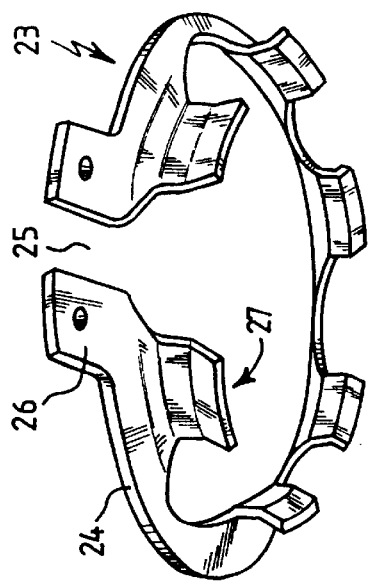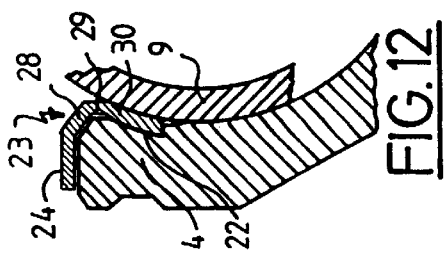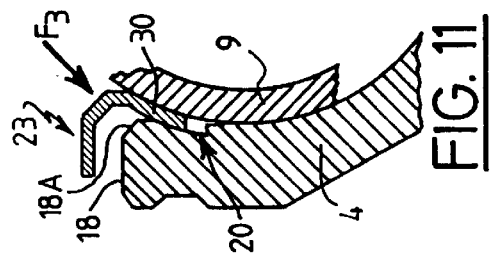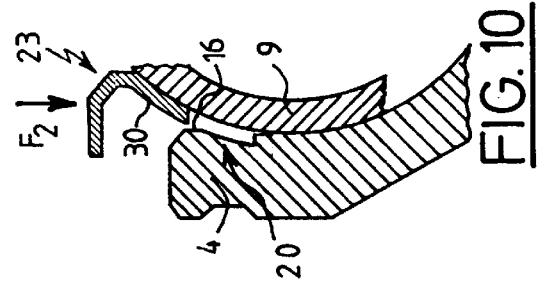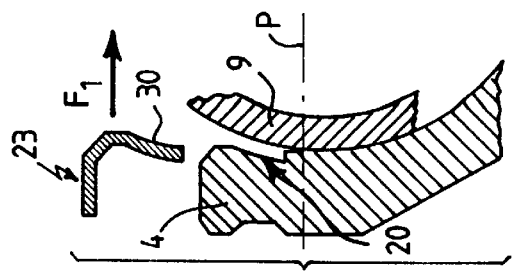

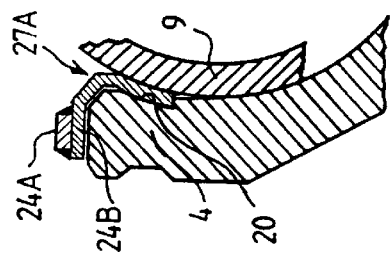
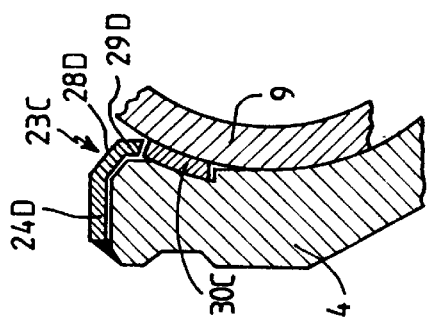
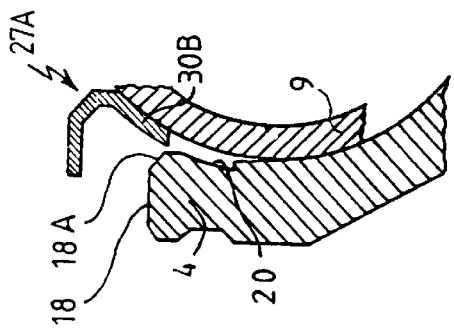
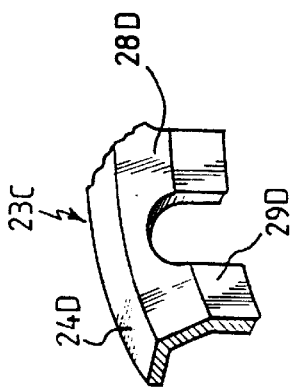
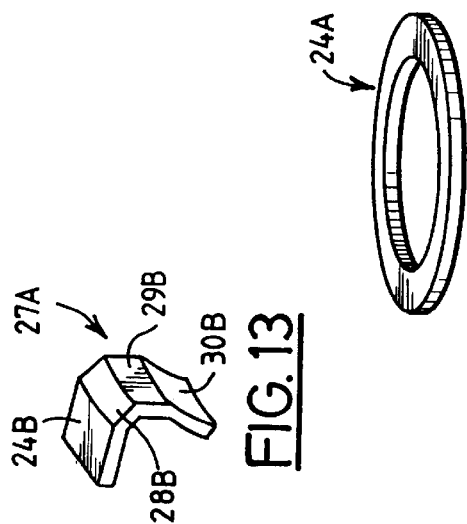
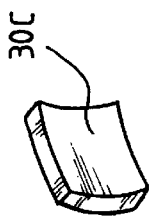

BALL-TYPE CONSTANT-VELOCITY UNIVERSAL JOINT

BACKGROUND OF THE INVENTION

The present invention relates to a ball type constant velocity joint assembly with means for holding a cage which is reliable, and which can be put in place with the joint in line.

Ball-type constant-velocity universal joints are designed having a cage within a bell housing. The cage must be secured within the bell housing. There is an opportunity to securely fix the cage in a reliable manner and with greater ease than in the prior art. The object of the subject invention is to provide a means for holding a cage in a ball-type joint assembly which is reliable and which secures the cage in place while the joint remains in line. In other words, without it being necessary to break the alignment of the joint or to carry out a relative rotation about the axis of the joint between the bell housing and the other elements of the joint.

SUMMARY OF THE INVENTION

The subject invention is a ball-type joint assembly comprising a bell housing secured to a first shaft. The cavity of the bell housing forms an axially inner spherical cap extended by an axial outer part which has no undercuts in the axial direction. The wall of the cavity includes six grooves open on the end face of the bell housing. The ball-type joint assembly comprises a core having six grooves, which is intended to be secured to a second shaft. Six balls are received respectively partly in the first set of grooves and partly in the second set of grooves. The assembly also comprises a cage for holding the balls and means for keeping the cage in a predetermined axial position. The means preferably comprises at least three axially undercut recesses made in the axially outer part of the cavity of the bell housing between the first set of grooves. With respect to each recess, a filling member, substantially matches the recess in meridian section. A filling member holding means holds the filling member in each of the respective recesses.

The filling members may be tabs formed integrally via their axially outer end with a split ring. The split ring may comprise a flat ring equipped with two radial projections which can be grasped for temporarily closing the split. The filling members may preferably be separate hook-shaped tongues including an outer appendage which covers the end face of the bell housing. The filling member holding means may comprise a rigid circular ring fixed, especially by welding, to all of the outer appendages. The filling members may be separate pads each of which is housed in a recess. In such an embodiment, the holding member preferably comprises a rigid cap including a circular ring which is rendered integral especially by welding with the end face of the bell housing. The rigid cap for each pad may include an axial appendage extending as far as this pad along the outer part of the cavity of the bell housing.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a view in longitudinal section of a ball-type joint in accordance with the invention;

FIG. 2 is a partial view of the cavity of the bell housing taken along its axis;

FIG. 3 is a cross-sectional view taken along line III—III of FIG. 2;

FIG. 4 is a partial view of the bell housing of FIG. 2;

FIG. 5 is a perspective view of a cap for holding the cage;

FIG. 6 is a partial view of the FIG. 5 cap taken from the axis of the cap;

FIG. 7 is a cross-sectional view taken along the line VII—VII of FIG. 6;

FIG. 8 is a partial cross-sectional perspective view of the FIG. 6 cap;

FIG. 9 is a partial cross-sectional view taken longitudinally illustrating a first step in the fitting of the cap of FIGS. 5–8;

FIG. 10 is a view similar to FIG. 9, but showing a successive step;

FIG. 11 is a view similar to FIGS. 9 and 10, but showing yet another subsequent step;

FIG. 12 shows a fourth subsequent step similar to FIGS. 9–11;

FIG. 13 is a perspective view of a holding tongue of a second embodiment of the invention;

FIG. 14 is a perspective view of a ring associated with the holding tongue;

FIG. 15 is a partial cross-sectional view taken longitudinally illustrating a first step for fitting the holding means of the cage of the second embodiment of the invention;

FIG. 16 shows a step subsequent to that shown in FIG. 15;

FIG. 17 is a perspective view of a holding pad of a third embodiment of the invention;

FIG. 18 is a perspective view of a cap associated with the pad; and

FIG. 19 is a partial cross-sectional view taken longitudinally illustrating the third embodiment.

DETAILED DESCRIPTION OF THE PREFERRED EMBODIMENT

Referring to FIG. 1, a ball-type transmission joint assembly is generally shown at 1, connecting two shafts of a motor vehicle, namely a transverse engine half shaft 2 having an end and a driving-wheel stub axle 3. The joint assembly 1 includes a bell housing 4 formed integrally with the stub axle 3. A core component 5 is fixed to the end of the half shaft 2 by splines 6 and a circlip 7. A set of six balls 8 are held by a cage 9. The cage 9 is held by a cage retainer, or means for holding 10. A sealing boot 11 having a wide end fixed around an entry to the bell housing 4 by means of a collar 12. A narrow end is fixed around the half shaft 2 by means of another collar 13. The joint assembly 1 is conventional, with the exception of the cage retainer 10. It is therefore unnecessary to describe the joint assembly 1 in detail. However, the following points are noted, assuming that the joint 1 is aligned along an axis X—X as shown.

The bell housing 4 has a cavity starting from its closed end 14 and being adjacent to the stub axle 3. An axially inner part 15 is in the form of a spherical cap which extends from an equatorial plane P perpendicular to the axis X—X by an axially outer cylindrical part 16. A first set of six grooves 17 are made in the cavity of the bell housing 4. Each of the grooves 17 extends partly into the part 15 and partly into the part 16. Each of the grooves 17 is open on an end face 18 of the bell housing 4 which is planar and parallel to the plane P and has an internal chamfered surface 18A.

The core component 5 includes a second set of six grooves 19 in the outer peripheral surface, which is approximately spherical. Each of the balls 8 is received partly in a groove 17 and partly in a groove 19.

The cage 9 includes six orifices 9A at equi-angular spacings, with each orifice 9A receiving a ball 8. The orifices 9A have a radially inner surface that is approximately spherical and may interact with the peripheral surface of the core component 5. The radially outer surface of orifices 9A is also approximately spherical and may interact with the inner spherical surface 15 of the bell housing 4.

The cage retainer 10 holds the cage 9 in a predetermined axial position after the assembly 5, 8, 9 (which have been previously preassembled) is introduced in line along the axis X—X into the bell housing 4.

Referring to FIGS. 2 to 4, the cage retainer 10 comprises six recesses 20, made in the cylindrical surface 16, of the bell housing 4 between the grooves 17. Viewed along the axis X—X (FIG. 2) each recess 20 has a rectangular shape bordered on its four sides by a region 21 of the surface 16. In longitudinal section (FIG. 3) the recess 20 has a triangular section, with a depth that increases towards a closed end 14. In other words, the recess 20 is undercut in the axial direction. The closed end 22 of each recess 20 is spherical.

Referring to FIGS. 5 to 8, the holding means 10 furthermore comprises a cap 23, made as a single piece of relatively elastic sheet metal. Cap 23 includes a flat ring 24 equipped with a radial slit 25. A lug 26 extends radially outward in the plane of the ring 24 and starts at each edge of this slit 25. Six tongues 27, with a C-shaped overall section start from the inner edge of the ring 24. More specifically, each tongue 27 includes an inclined conical root 28 which matches the chamfer 18A of the bell housing 4, a cylindrical intermediate part 29 perpendicular to the plane of the ring 24, and a filling tab 30 which is internally and externally spherical.

Referring to arrow F1 of FIG. 9, in order to fit the cap at 23, on the bell housing 4 all that is required, after having brought it up to face the end 18 of the bell housing 4 is for slit 25 to be closed. Next, referring to arrow F2 of FIG. 10, the cap 23 is shifted axially until the tabs 30 come into contact with the cage 9. Then, referring to arrow F3 of FIG. 11, lugs 26 are released while maintaining contact between the tabs 30 and the cage 9. In this way, each tab 30 becomes housed in a recess 20, and practically fills all the empty space between the closed end 22 of the recess 20 and the spherical surface 15 opposite of the cage 9. Referring to FIG. 12, parts 24, 28 and 29 of the cap 23 substantially match the parts 18, 18A and 16 of the bell housing 4, respectively.

Due to the undercut configuration of the recesses 20, the cage 9 is therefore firmly held in its predetermined axial position without any additional operations being necessary. Further, the joint 1 can easily be dismantled.

Referring to FIGS. 13 to 16, a second embodiment of the subject invention differs from the previous one only in the fact that the unitary cap 23 is replaced by an assembly consisting on the one hand of six separate tongues, generally indicated at 27A, and on the other hand of a flat connecting ring 24A. Each tongue 27A has the same overall C-shape as before. In other words, it includes, in succession, a flat part 24B, a substantially conical part 28B, a cylindrical intermediate part 29B perpendicular to the plane of the part 24B, and a filling tab 30B which is internally and externally spherical.

Referring to FIG. 15, when assembly of the joint 1 is complete, each tongue 27A is fitted into its respective recess 20 by placing the tab 30B on the spherical outer surface of the cage 9. Then the tab 30B slides over the cage 9 by rotational movement in the corresponding meridian plane. When the six tongues 27A are in place, their parts 24B lie on the end face 18 of the bell housing 4. Referring to FIG. 16, the ring 26 is placed over them and the ring 26 is fixed to these parts 24B, for example by welding.

It should be noted that, on the one hand, the rotational movement used to fit each tongue 27A does not require the tab 30B to have any clearance in the recess 20. The cage 9 may therefore be held in position very accurately. Further, the tongues 27A are welded to the ring 24A and it is easy to select metals for these components in such a way that welding is reliable.

Referring to FIGS. 17 to 19, a third embodiment of the subject invention differs from the previous one only in the fact that use is made on the one hand of six separate pads 30C, and on the other hand use is made of a holding cap 23C.

Each pad 30C has the same spherical shape as the tab 30B of FIG. 13 and as the tab 30 of FIGS. 5 to 8. The cap 23C has the same configuration as the cap 23 of FIGS. 5 to 8 after removal of the six tabs 30 and elimination of the slit 25 and of the lugs 26. The cap 23C is thus a rigid component.

To complete the assembling of the joint 1 each pad 30C is fitted by rotational movement identical to the movement described earlier with reference to FIG. 15. The cap 23C is then brought along axially and its ring 24D is fixed to the end face 18 of the bell housing 4, preferably by welding. The free end of the cylindrical parts 29D is therefore facing the pads 30C and holds them in place.

As an alternative, if the pads 30C have a different outline, they may be held in the recesses 20 by the interior periphery of a flat ring 24 similar to the ring 24A of FIG. 14. The flat ring 24 can be welded to the bell housing 4.

Preferred embodiments have been disclosed. However, the true scope of this invention is set forth by the following claims.

I claim:

1. A ball-type constant velocity universal joint, comprising:

a bell housing to be secured to a first shaft, said bell housing having an axis and a cavity forming an axially inner spherical cup extended by an undercut-free axially outer part in the axial direction, said cavity having a wall with a first plurality of grooves therein, said grooves are separated by surfaces, said grooves being open on an end face of said bell housing;

a core having a substantially spherical outer shape and having a second plurality of grooves therein, said core being intended to be secured to a second shaft, a plurality of balls disposed partly in said first plurality of grooves and partly in said second plurality of grooves, and a cage for holding said balls, said cage having substantially spherical inner and outer surfaces; and holder means for maintaining said cage in a predetermined axial position relative to said bell housing, said holder means including a plurality of recesses made in said axially outer part of said cavity of said bell housing between respective adjacent pairs of said first grooves, said recesses extending into said surfaces, with portions of said surfaces remaining on both sides of said recesses, and axially outwardly of said recesses, a filling member disposed in each of said recesses, and a holding member for holding said filling members in the respective recesses.

2. A ball-type joint according to claim 1, comprising six of said recesses.

3. A ball-type joint according to claim 1, wherein each said recess has a substantially spherical bottom surface and each said filling member has substantially spherical outer and inner surfaces said filling member surfaces engaging the respective bottom surface and the outer surface of the cage, respectively.

4. A ball-type joint according to claim 1, wherein said filling members are tabs formed integrally at an axially outer end thereof with a split ring.

5. A ball-type constant-velocity universal joint comprising:

a bell housing to be secured to a first shaft, said bell housing having an axis and a cavity forming an axially inner spherical cup extended by an undercut-free axially outer part in the axial direction, said cavity having a wall with a first plurality of grooves therein, said grooves being open on an end face of said bell housing;

a core having a substantially spherical outer shape and having a second plurality of grooves therein, said core being intended to be secured to a second shaft, a plurality of balls disposed partly in said first plurality of grooves and partly in said second plurality of grooves, and a cage for holding said balls, said cage having substantially spherical inner and outer surfaces;

holder means for maintaining said cage in a predetermined axial position relative to said bell housing, said holder means including a plurality of axially undercut recesses made in said axially outer part of said cavity of said bell housing between respective adjacent pairs of said first grooves, a filling member disposed in each of said recesses, and a holding member for holding said filling members in the respective recesses; and said filling members are separate hook-shaped tongues including an outer appendage which covers said end face of said bell housing, and said holding member comprises a rigid circular ring fixed to all of said outer appendages.

6. A ball-type joint according to claim 5, wherein said ring is welded to said appendages.

7. A ball-type joint according to claim 5, comprising six of said recesses.

8. A ball-type joint according to claim 5, wherein each said recess has a substantially spherical bottom surface and each said filling member has substantially spherical outer and inner surfaces which, in use, engage the respective bottom surface and the outer surface of the cage, respectively.

9. A ball-type constant-velocity universal joint comprising:

a bell housing to be secured to a first shaft, said bell housing having an axis and a cavity forming an axially inner spherical cup extended by an undercut-free axially outer part in the axial direction, said cavity having a wall with a first plurality of grooves therein, said grooves being open on an end face of said bell housing:

a core having a substantially spherical outer shape and having a second plurality of grooves therein, said core being intended to be secured to a second shaft, a plurality of balls disposed partly in said first plurality of grooves and partly in said second plurality of grooves, and a cage for holding said balls, said cage having substantially spherical inner and outer surfaces;

holder means for maintaining said cage in a predetermined axial position relative to said bell housing, said holder means including a plurality of axially undercut recesses made in said axially outer part of said cavity of said bell housing between respective adjacent pairs of said first grooves, a filling member disposed in each of said recesses, and a holding member for holding said filling members in the respective recesses; and said filling members are separate pads each of which is housed in a respective one of said recesses and said holding member is a cap which includes a rigid circular ring secured to said end face of said bell housing.

10. A ball-type joint according to claim 9, wherein said ring is welded to said end face.

11. A ball-type joint according to claim 9, wherein said cap includes an axial appendage extending to each of said pads along said outer part of said cavity of said bell housing.

12. A ball-type joint according to claim 9, comprising six of said recesses.

13. A ball-type joint according to claim 9, wherein each said recess has a substantially spherical bottom surface and each said filling member has substantially spherical outer and inner surfaces which, in use, engage the respective bottom surface and the outer surface of the cage, respectively.

* * * * *